July 23, 1957     E. W. BECHTOLD ET AL     2,800,052
COMBINATION WIDE ANGLE AND TELEPHOTO LENS ATTACHMENT
Filed July 12, 1955

INVENTORS.
EDWIN W. BECHTOLD
MARVIN KAPILOW &
ALEX J. WEINSTEIN
BY

ATTORNEYS

United States Patent Office 2,800,052
Patented July 23, 1957

2,800,052

COMBINATION WIDE ANGLE AND TELEPHOTO LENS ATTACHMENT

Edwin W. Bechtold, Middle Village, Marvin Kapilow, Peekskill, and Alex J. Weinstein, Mount Vernon, N. Y., assignors to The Ednalite Optical Company, Inc., Peekskill, N. Y., a corporation of New York Application July 12, 1955, Serial No. 521,532

5 Claims. (Cl. 88—1.5)

This invention relates generally to accessory lenses for cameras, and is particularly directed to a novel accessory lens adapted to convert cameras for both wide angle and telephoto use.

Heretofore, as is well known to those versed in the art, the conversion of motion picture and still cameras to wide angle usage required substitution for the camera lens or attachment thereto of a special wide angle accessory lens; and in addition, version for telephoto use required substitution for the camera lens or the attachment thereto of a different, special telephoto accessory lens. This, of course, was extremely inconvenient. Further, prior wide angle and telephoto accessory lenses were relatively complex in construction, expensive to produce, and not well suited for attachment to a great variety of cameras.

Accordingly, it is a general object of the present invention to provide an accessory lens or lens system, which overcomes the above mentioned disadvantages of the prior art, and which can be quickly and easily attached to a camera for either wide angle or telephoto use, as desired. In addition, the accessory lens or lens system of the instant invention is capable of use with a wide variety of camera lenses.

It is a more particular object of the present invention to provide a lens system having the advantageous characteristics mentioned in the foregoing paragraph, which system includes a lens mount or barrel having it opposite ends adapted for attachment to the lens assembly of a camera for reversing the lens system with respect to the camera lens assembly.

It is another object of the present invention to provide an accessory lens of the type described, which is reversible for selective attachment of its opposite ends to the lens assembly of a camera, and which includes a view finder adapted to be automatically properly positioned for use with the accessory lens in both of its selective positions of attachment.

It is a further object of the present invention to provide a reversible, combination wide angle and telephoto lens accessory, which is extremely simple in construction and operation, durable in use, and which can be manufactured and sold at a reasonable cost.

Other objects of present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
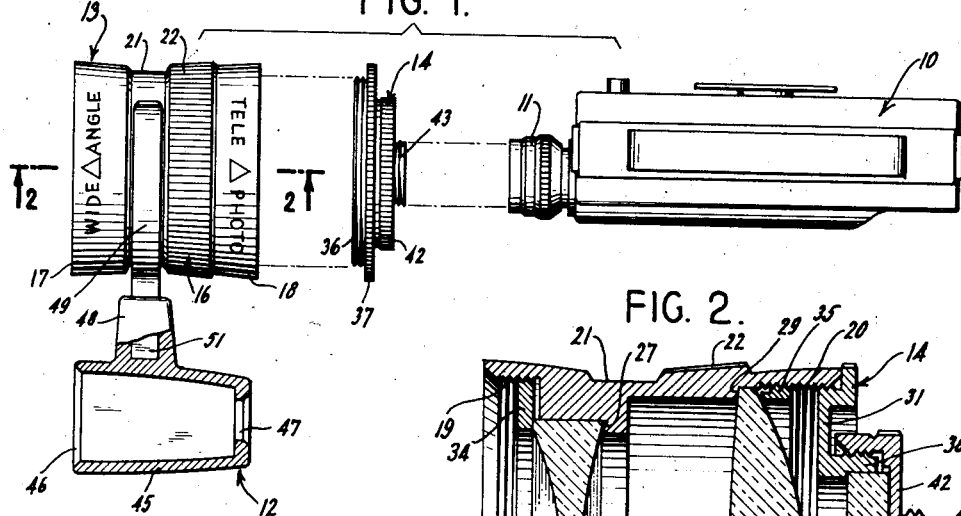
Figure 1 is an exploded, plan view, partly broken away, showing a motion picture camera, adapter for the camera lens, accessory lens of the present invention, and a view finder therefor, the latter being partly broken away for clarity of understanding.

Referring now more particularly to the drawings, and specifically to Fig. 1 thereof, a camera, shown for purposes of illustration as a motion picture camera, is designated 10, and provided with an objective lens assembly 11. An accessory lens or lens system, generally designated 13, is adapted to be selectively connected at either end in optical alignment with the camera lens assembly 11 by an adapter or adapting ring, generally designated 14. Extending longitudinally alongside of and detachably mounted on the accessory lens 13 is a view finder or viewer, generally designated 12, for use with the accessory lens.

Figure 2:
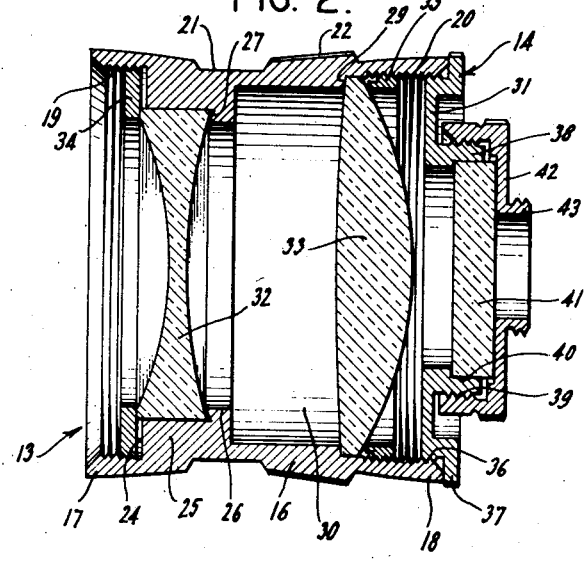
Fig. 2 is a longitudinal sectional view of the accessory lens, taken substantially along the line 2—2 of Fig. 1.

In Fig. 2 the lens assembly 13 is shown in greater detail as including an open ended, generally tubular mount or barrel 16 having its opposite end portions 17 and 18 formed with internal screw threads 19 and 20, respectively. The external surfaces of the barrel portions 17 and 18 are somewhat flared longitudinally outwards of the barrel. Adjacent to the barrel end portion 17, exteriorly of the barrel 16, there is formed a circumferential groove 21 which defines a generally cylindrical external surface, for a purpose appearing presently. A circumferential band of longitudinally extending ribs or knurling 22 is formed on the exterior surface of the barrel 16 between the groove 21 and barrel end portion 18.

Interiorly of the barrel 16, the screw threads 19 terminate just short of an annular shoulder 24 facing outwards through the barrel end portion 17 and defined by an internal barrel portion 25 of reduced inside diameter. The internal barrel portion 25 is formed with an internal annular rib or ledge 26, spaced from the shoulder 24 and having one side undercut, as at 27, to define an annular lens seat facing outwards toward the barrel and portion 17. Spaced from the internal, annular rib 26, toward the barrel end portion 18, the barrel is formed with an internal, annular shoulder, ledge or lens seat 29 facing outwards through the latter barrel end portion. The interior barrel surface 30 is illustrated as being smooth and generally cylindrical, but may be formed otherwise, say for reducing reflection, if desired.

Fixedly positioned in assembled relation within the barrel or mount 16 are a pair of coaxial, spaced optical elements or lenses 32 and 33. More particularly, a negative or diverging lens 32 is received within the reduced internal barrel portion 25 and firmly held against the lens seat 27 by a lock nut or retaining ring 34 engaged in the screw threads 19. The retaining ring 34 is externally threaded for engagement in the screw threads 19 and abuts the diverging lens 32 to fix the latter in engagement with the lens seat 27. The optical element or lens 33 is of converging or positive power and received within the barrel 16 adjacent to the barrel end portion 18 engagement with the annular lens seat 29. The converging lens 33 is held firmly on the lens seat 29 by an externally threaded annular lock nut or retaining ring 35 in threaded engagement with the screw threads 20.

Figure 4:
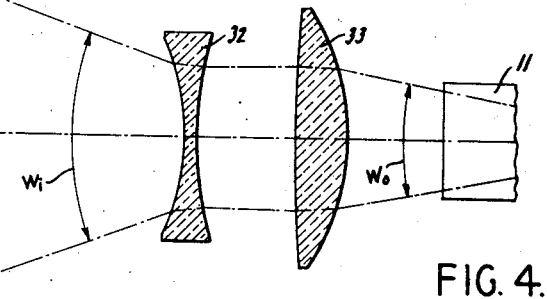
Fig. 4 is a schematic optical layout or ray diagram showing the accessory lens system of the present invention employed as a wide angle converter.
Figure 5:
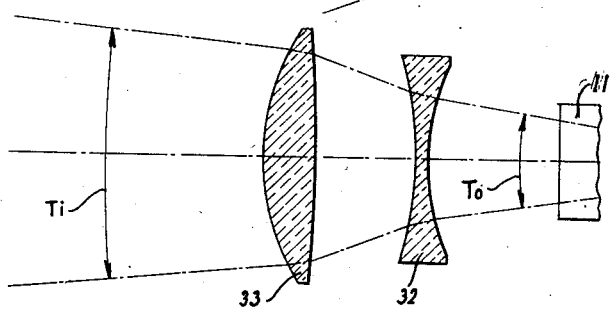
Fig. 5 is a schematic optical layout or ray diagram showing the lens system of the instant invention employed as a telephoto accessory.

The lenses 32 and 33 are of such relative powers, and sufficiently spaced apart, as by air, so as to define a substantially afocal system. Stated otherwise, the diverging lens 32 is interposed in spaced relation between the converging line 33 and the focal point of the latter, such that the lens system 32—33 will produce an image at infinity from an object at infinity. Further, a bundle of parallel light rays entering the barrel through either end thereof and passing initially through one of the lenses, will emerge from the other lens and the opposite barrel end in substantial parallelism. However, the angle with respect to the optical axis at which a bundle of parallel rays enter the barrel will be changed when the bundle emerges from the barrel, so that the angle of the cone of effective rays received in either end of the barrel will differ from the angle of the cone of effective rays emerging from the opposite barrel end. This is best seen in Figs. 4 and 5, the former illustrating wide angle usage of the lens system, and the latter showing its telephoto operation. Thus, in Fig. 4, a cone of effective light rays of relatively wide angle $W_1$ are received by the negative lens 32, and a cone of effective light rays of relatively narrow angle $W_0$ emerge from the plus lens 33. Obviously, the light rays from a relatively wide field of view are thereby constricted to an angle adapted to be received by a camera having a normal objective lens assembly. Thus, in wide angle use, a bundle of parallel light rays entering through the diverging lens 32 at a particular angle with respect to the optical axis will be diverged by the latter lens, and subsequently converged into parallelism by the lens 33, emerging from the latter at a decreased or lesser angle with respect to the optical axis. In both conditions of use, an upright virtual image is formed of an object at infinity, the telephoto arrangement enlarging the image and the wide angle arrangement diminishing the image.

In telephoto use, the lens system is reversed, so that a cone of light rays having an effective cone angle $T_1$ enter the system through the positive or converging lens 33 and emerge from the diverging lens 32 having a cone angle $T_0$ which is greater than $T_1$. When employed in this manner, the lenses 32 and 33 serve to increase the angle of a cone of light rays received from an object, so that a relatively narrow field of view is thereby enlarged. As a telephoto lens system, a bundle of parallel rays entering through the converging lens 33 at a particular angle with respect to the optical axis will be converged by the latter lens, and subsequently diverged into substantial parallelism by the diverging lens 32, and emerge from the latter lens at an increased angle with respect to the optical axis.

By way of practical example, and without intent to be limited thereto, it is preferred to employ a converging lens of 60 mm. focal length, and a diverging lens of 40 mm. focal length, and to space the lenses in air approximately 20 mm. However, any combination of lens spacing and focal lengths which produce an afocal lens system having the above described characteristics will operate satisfactorily.

In order to attach the accessory lens 13 to the camera objective assembly 11, any suitable adapter, such as that illustrated at 14, may be employed. The particular adapter 14, as illustrated, includes a relatively large annulus 31 having external screw threads 36 threadedly engageable in the barrel threads 20, and an outstanding peripheral flange 37 adapted to abut the barrel end and limit threaded engagement of the annulus into the barrel. A reduced annular neck or nipple 38 is provided on the annulus 31 extending longitudinally outwards with respect to the barrel and formed with external screw threads 39 of considerably less diameter than the screw threads 36. The reduced neck 38 is internally recessed at 40 for receiving a filter 41. A cup-like filter retainer 42 is internally threaded for engagement about the neck 38, and provided with a centrally located externally threaded nipple 43 for threaded engagement in the object lens assembly. By this construction, the accessory 13 may be selectively, detachably secured in optically aligned relation to the objective lens assembly 11 with the barrel end portion 18 rearmost, adjacent to the objective lens assembly; or, by threaded engagement of the threads 36 of the annulus 31 in the barrel threads 19, the accessory lens 13 may be reversed, and secured with its barrel end portion 17 rearmost, adjacent to and in optical alignment with the camera objective lens assembly 11. Obviously, the accessory lens 13 may be independently removed from the adapter 14, without removing the latter, to leave the filter 41 in operative position on the camera.

The viewer or viewfinder 12 includes an elongate, open ended barrel or tube 45 disposed in its normal, operative position longitudinally alongside of the barrel 16. The tube 45 may be of generally rectangular cross sectional configuration and preferably tapers from one end toward the other end thereof. The larger end of the viewer tube 45 is formed with a generally rectangular relatively large opening 46; and, the smaller tube end is formed with a relatively small, generally rectangular opening 47 in substantial alignment with the opening 46. It will be noted that the relatively large end opening 46 is disposed adjacent to the barrel end portion 17 and diverging lens 32, while the relatively small end opening 47 is disposed adjacent to the barrel end portion 18 and the converging lens 33.

Figure 3:
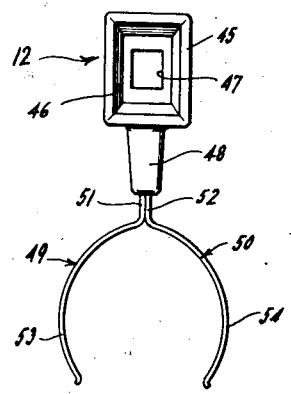
Fig. 3 is an end view of the view finder of the present invention, removed from the lens system.

Extending laterally from the exterior of the finder tube 45 toward the accessory lens barrel 16 is a stem or projection 48. Embedded in or otherwise fixedly secured to the stem 48 are a pair of somewhat resilient strips or legs 49 and 50. As best seen in Fig. 3, the strips 49 and 50 are formed, respectively, with relatively straight end portions 51 and 52 extending in side by side relation from the free end of the stem 48. Further, the legs 49 and 50 indicate arcuate strip portions 53 and 54 bowed outwards from each other, which are each connected at one end to a respective straight strip portion 51 and 52 and have their other ends free. By this construction, the legs 49 and 50 are adapted to have their bowed portions 53 and 54 snugly and frictionally embrace the barrel 16, being engaged in the barrel groove 21. The groove 21 will, of course, prevent inadvertent longitudinal shifting of the legs 49 and 50, and consequently of the finder tube 45. However, the bowed leg portions 53 and 54 may be moved along the circumferential extent of the groove 21 to permit rotation of the finder tube 45 to any desired position of angular adjustment about the barrel 16, and the resilient legs frictionally engage with the barrel to retain the finder tube in its selected position of adjustment.

While the entire finder assembly 12 is quickly and easily removable or detachable from the accessory lens 13, by mere withdrawal of the legs 49 and 50 from the barrel groove 21, such detachment is not necessary when it is desired to reverse the accessory lens between its telephoto and wide angle conditions of attachment to the camera. That is, the relative sizes of the finder tube openings 46 and 47, and the distance between the openings, is such that the larger opening will define the wide angle field of view and the smaller opening will define the telephoto field of view to the eye of an operator. Hence, the view finder 12 need not be removed from the accessory lens 13 upon reversal of the latter, but reverses with the accessory lens and automatically cooperates with the latter to define the field of view in both conditions of use.

From the foregoing, it is seen that the present invention provides an accessory lens and finder for use therewith which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A device for attachment to the lens assembly of a camera, said device comprising a lens mounting barrel, means on opposite ends of said barrel for attaching a selected barrel end to said camera lens assembly, a converging lens fixed in said barrel adjacent to one end thereof, a diverging lens fixed in said barrel adjacent to the other end thereof, said converging and diverging lenses being of such relative powers and so spaced that substantially parallel light rays from an object entering said barrel through each end thereof emerge from the opposite barrel end in substantial parallelism but at a different angle with respect to the optical axis to adapt said barrel and lenses for telephoto and wide angle usage in respective positions of attachment of said barrel to said camera lens assembly, and a tubular open ended view finder arranged longitudinally alongside of and secured to said barrel, the opening at one end of said view finder adjacent to said diverging lens being larger than the opening at the other end of said view finder adjacent to said converging lens and said view finder lens openings being proportioned relative to the fields of view of said barrel and lenses in the wide angle and telephoto positions, whereby said view finder functions selectively to define a wide angle and telephoto field of view upon corresponding positioning of said barrel with respect to said camera lens assembly.

2. A lens system according to claim 1, in combination with a pair of resilient legs fixed to said view finder and frictionally embracing said mount to releasably and adjustably secure said view finder to said mount.

3. In combination, a camera having a lens assembly, an auxiliary lens assembly adapted to selectively increase and decrease the equivalent focal length of the camera lens assembly when arranged in adjacent alignment with the latter lens assembly having its opposite ends disposed respectively adjacent to the latter lens assembly, means on the opposite ends of said auxiliary lens assembly for detachably and selectively securing the latter to said camera lens assembly, and a tubular open ended view finder arranged longitudinally alongside of said auxiliary lens assembly, the opening at one end of said view finder being larger than the opening at the other end of said view finder and said end openings being proportioned relative to the fields of view of said auxiliary lens assembly in its wide angle and telephoto positions, whereby said view finder is automatically arranged to define the field of view of said auxiliary lens assembly in its selected positions of attachment to said camera lens assembly.

4. The combination with a camera having an objective lens assembly of an open ended barrel having its opposite ends adapted for selective attachment to said lens assembly, said barrel being formed intermediate its ends with an external peripheral groove, a converging lens in said barrel and disposed forwards when said barrel is in one position of its selective attachment for receiving a cone of bundles of parallel light rays, and a diverging lens in said barrel disposed rearwards of said converging lens in said one selective position of barrel attachment and interposed in spaced relation between said converging lens and the focal point of the latter to receive bundles of converging rays from said converging lens, said diverging lens being of sufficient strength to substantially realign the rays of the last mentioned bundles in approximate parallelism and in a cone of increased angle for telephoto use, said diverging lens serving to receive a cone of bundles of parallel light rays and transmit bundles of diverging light rays to said converging lens when said barrel is disposed in its other selective position of attachment, said converging lens being of sufficient strength to substantially realign the rays of the last mentioned bundles in approximate parallelism and in a cone of decreased angle for wide angle use.

5. The combination according to claim 4, in combination with a tubular, open ended view finder arranged longitudinally alongside of said barrel, the opening at one end of said view finder adjacent to said diverging lens being larger than the opening at the other end of said view finder adjacent to said converging lens, the end openings of said view finder being proportioned relative to the fields of view of said lens system in its wide angle and telephoto uses, and a pair of resilient legs fixed to said view finder and frictionally embracing said barrel in the peripheral groove thereof, said legs serving to releasably secure said view finder to said barrel and frictionally retain said view finder in any selected position of rotation about said barrel.

References Cited in the file of this patent

UNITED STATES PATENTS

| | | |
|---|---|---|
| 756,779 | Dallmeyer | Apr. 5, 1904 |
| 1,025,057 | Hampson | Apr. 30, 1912 |
| 1,651,493 | Warmisham | Dec. 6, 1927 |
| 1,671,558 | Wandersleb | May 29, 1928 |
| 1,925,393 | Lehman | Sept. 5, 1933 |
| 1,934,561 | Rayton | Nov. 7, 1933 |
| 2,056,421 | Cooper | Oct. 6, 1936 |
| 2,157,547 | Leitz | May 9, 1939 |
| 2,184,018 | Ort | Dec. 19, 1939 |
| 2,284,757 | Morton | June 2, 1942 |
| 2,322,399 | Sperry et al. | June 22, 1943 |
| 2,324,057 | Bennett | July 13, 1943 |
| 2,331,667 | Eaton | Oct. 12, 1943 |
| 2,487,773 | Schwartz et al. | Nov. 8, 1949 |

FOREIGN PATENTS

| | | |
|---|---|---|
| 722,817 | France | Jan. 5, 1932 |